United States Patent [19]

Bernard

[11] 3,779,676

[45] Dec. 18, 1973

[54] APPARATUS FOR MAKING COMPOSITE PRODUCT

[75] Inventor: Alain Clair Bernard, Nantes, France

[73] Assignee: Alain Clair Bernard, Nantes, France

[22] Filed: Oct. 14, 1971

[21] Appl. No.: 189,109

[52] U.S. Cl. .............................. 425/131, 425/192
[51] Int. Cl. ............................................... B29f 1/12
[58] Field of Search .................... 425/297, 131, 133

[56] References Cited
UNITED STATES PATENTS

| | | | |
|---|---|---|---|
| 3,268,970 | 8/1966 | Kelly et al. | 425/131 |
| 3,294,692 | 12/1966 | Kelly et al. | 425/131 X |

FOREIGN PATENTS OR APPLICATIONS

| | | | |
|---|---|---|---|
| 374,147 | 6/1932 | Great Britain | 425/131 |
| 322,603 | 8/1957 | Switzerland | 425/131 |
| 562,152 | 3/1957 | Italy | 425/131 |

Primary Examiner—H. A. Kilby, Jr.
Attorney—Sughrue, Rothwell, Mion, Zinn & Macpeak

[57] ABSTRACT

An extruding machine and process is provided for making composite products, such as soap, that comprise two separate materials joined without mixing. The extruder is comprised of a pair of circular plates and annular plates. The circular plates are joined together by a plurality of tubular members. The annular plates have conduits and radial fins for directing the two separate materials along an axial direction. A cutter and mold are provided for producing the finished product such as striped soap.

9 Claims, 4 Drawing Figures

APPARATUS FOR MAKING COMPOSITE PRODUCT

BACKGROUND OF THE INVENTION

1. Field of the Invention

The present invention relates to a method for simultaneously extruding composite products constituted by a mass of basic material and veins of at least a different material and to devices for extruding such products and the new products thus obtained. The invention is more specifically applicable to the extrusion of pasty materials into low hardness solid products in normal temperature and pressure conditions such as plastic materials, confectionery products or sanitary products such as soap and toilet soap. In the present disclosure, it will be made reference essentially to soaps and toilet soaps, but it is understood that the method and devices according to the present invention are applicable to the extrusion of all the products having a similar or approximating consistency.

2. Description of the Prior Art

In the prior art, it is known to extrude simultaneously several different soapy materials which are especially different with respect to the color, and to form a mass, for example in the shape of a bar, presenting a mottled aspect in which the veins of the additional material or materials have an irregular section and are randomly distributed in the basic material.

It is also known to obtain soap boars shaped around a single stick of different soapy material through compression and with the help of a bonding solution for associating together the bar and the stick.

It is still known to shape separately two or more portions of different soapy materials and then to join the portions of different soapy materials through compression into a single block, but it is necessary to operate in a vacuum in order for the joining of the heterogeneous materials to be made and it is necessary that the freshly extruded surfaces not be in contact with the air.

It should be noted that, in those two latter cases where the purpose was to obtain soaps having quite distinct and well delimited areas of various materials, the shaping of the sections of each material has to be made before associating the various sections for obtaining the final product.

Methods are also known in which various materials are provided in individual extrusion dies, but for lack of direction or guiding means, the strips of material coming out of the dies are joined in the extrusion nozzle in an anarchical manner resulting only in a mottled product. In place of stationary extrusion dies, some of those processes provide for rotating distribution members with vertical channels which distribute under gravity, streams of various materials which mix together disorderly with the result that the products still have a mottled effect.

The only process, in the knowledge of the applicant, which permits manufacturing of soapy bars in which additional materials are distributed in a well delimited and well controlled manner is not a simultaneous extrusion process, but a process in which grooves are provided in the basic material and such grooves are filled with the additional materials. This process raises the problem of obtaining a durable joining of two heterogeneous materials. This could not be obtained unless the process is carried out under vacuum and with costly and complicated equipment.

All these processes or devices of the prior art present disadvantages because either the products obtained might be only mottled or because the association of the various materials is neither perfect nor durable and requires complicated and costly processes and equipment, if it is desired to obtain products in which the composing materials are well differentiated.

SUMMARY OF THE INVENTION

An object of the present invention is to remove such disadvantages by providing the manufacture of composite soaps or toilet soaps made of two or more various materials which are well differentiated and regularly distributed while being associated in a perfect and durable manner and this without requiring complicated and therefore costly manufacturing conditions, it being understood that the present invention retains the important advantage of continuous manufacturing.

For this purpose, the present invention provides for the extrusion of the various materials to be simultaneous and progressive in order to ensure a good joining and provides for the various materials to be directed by the means which are disclosed herein below, for obtaining a regular and well delimited distribution of the additional materials in the basic material.

An object of the present invention is also to provide devices permitting the continuous manufacturing through simultaneous extrusion and without requiring special and costly conditions such as treatment under vacuum or with high pressures.

More specifically, an object of the present invention is the extrusion of a continuous bar of basic material including veins of additional materials. These veins may be distributed in section according to substantially circular segments. These veins break through preferably on the periphery of the bar as apparent and regular stripes which are arranged in an orderly manner and in such a way that they are parallel the ones with respect to the others. These stripes may remain apparent even in case of concentric erosion or wearing as they correspond to veins in the mass. These veins are additionally well differentiated and quite distinct without migration of the product or of the color from one of the veins to the other or from one of the veins towards the mass. The additional materials constituting the veins in the mass or the stripes on the surface might correspond to predetermined and controlled quantities of the additional materials proportionally with respect to the quantity of the basic material. These additional materials may be dyestuffs permitting color effects which contrast with the basic substance. They may be also perfumed materials, deodorants, emollient substances, skin softeners, germicides, etc.

The balanced and regular distribution of the additional materials in the mass permits, when the soap or the toilet soap is in use, for instance, for a quantity of additional materials which is substantially proportional to the quantity of the additional materials contained in the product, to be deposited on the skin of the user.

According to the invention, such a process of simultaneous extrusion of at least two different materials resides in the extrusion under pressure of each one of the materials to form veins of materials without any intermixing between themselves. The materials are guided forward, still without intermixing between themselves, in order that they converge towards a same axis and, finally, in the radial compression of the converging veins in such a manner that they associate together without mixing for obtaining a mass provided with veins visible on the surface of the mass as orderly and substantially parallel stripes.

More specifically, such a simultaneous extrusion process for at least two different materials provides for the first material under pressure to go through the second material also under pressure while the two materials have no contact between them; for continuing the travel under pressure of the two materials through the respective openings of a plate whereby the materials are subject to an initial extrusion without contact between themselves; for continuing the extrusion of the two materials still without contact between them and respectively in the radial recesses and the radial consecutive apertures of a first annular member; for having the two materials in contact by guiding radially the extruded veins of the additional material and the mass of the basic material in the corresponding radial channels of a second annular member; for radially and longitudinally compressing the veins in at least one sleeve in the shape of a truncated cone for obtaining at the end of the extrusion a mass appearing as a composite bar which is radially veined in an orderly manner in the mass.

In addition, according to the invention, this extrusion process is carried out in a device which includes an assembly of tubular members arranged around the extrusion axis and through which one of the materials is fed under pressure; a plate with openings through which the other material is fed under pressure, the openings being arranged around the extrusion axis, each one of the tubular members discharging in this plate in a position which is intermediate between two consecutive openings; at least a plate having apertures corresponding to the openings and recesses corresponding to the tubular members; a sleeve bored in the shape of a truncated cone arranged for radially compressing the veins of the extruded materials coming from the plate and for associating same between them in order to form a compact bar.

More specifically, such an extrusion device, according to the invention comprises, arranged in a consecutive manner and joined with respect to the others in a connected manner, the following members: a chamber in which the tubular members pass through for flowing the first material under pressure, this chamber having a feeding portion for the second material under pressure and having the extrusion openings of the second material arranged between the outlets of the tubular members in its wall supporting same; a first annular plate having radial apertures corresponding to the extrusion openings and radial recesses corresponding to the outlets; a second annular plate having internal channels corresponding to the radial openings and the radial recesses of the first plate; and, finally, at least a sleeve bored in the shape of a truncated cone for the radial compression of the veins and the mass, formed through the extrusion of the two materials through the various successive members, this sleeve being designed for associating the veins to the mass of the basic material without permitting for the various materials to intermingle.

Finally, the present invention relates to one of the applications of such a process which is, for the present time, preferred, namely the manufacture of soaps or toilet soaps, the soaps or tiolet soaps having a specific constitution with respect to the soaps or toilet soaps which are known at present, as they are composed of at least two materials which are different especially in connection with their color, the materials appearing as veins distinguishing from the basic material and substantially without migration of the color into the mass; those veins break through on the external surface of the soap or toilet soap as contrasing and regular stripes arranged in an orderly manner and in order to be substantially parallel between themselves.

In drawings which illustrate embodiments of the invention:

DESCRIPTION OF THE PREFERRED EMBODIMENT

Figure 1:
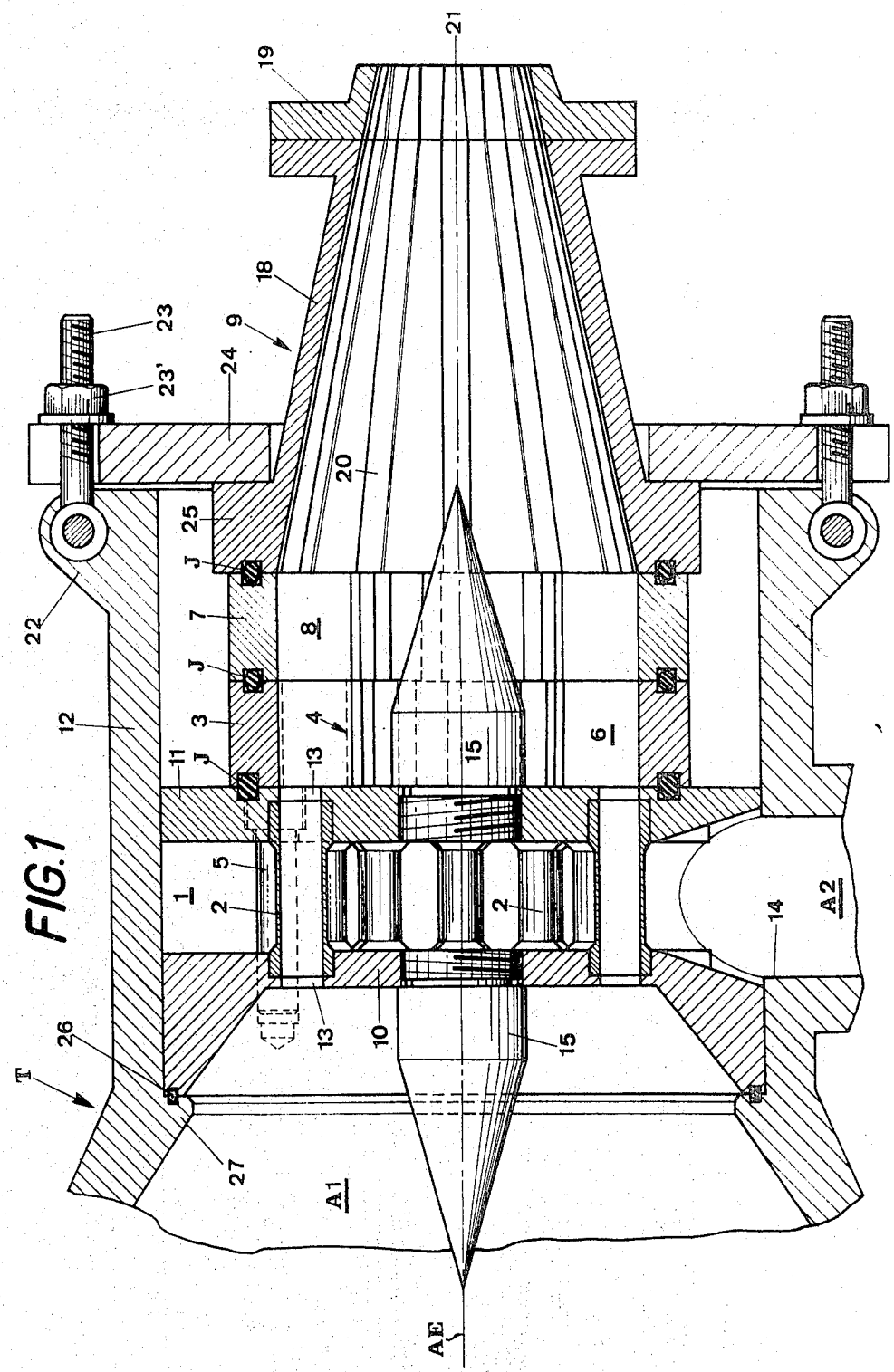
FIG. 1 is a sectional view of an extrusion head in which there is included the device for effectuating the process according to the present invention for the simultaneous extrusion of at least two different materials.
Figure 2:
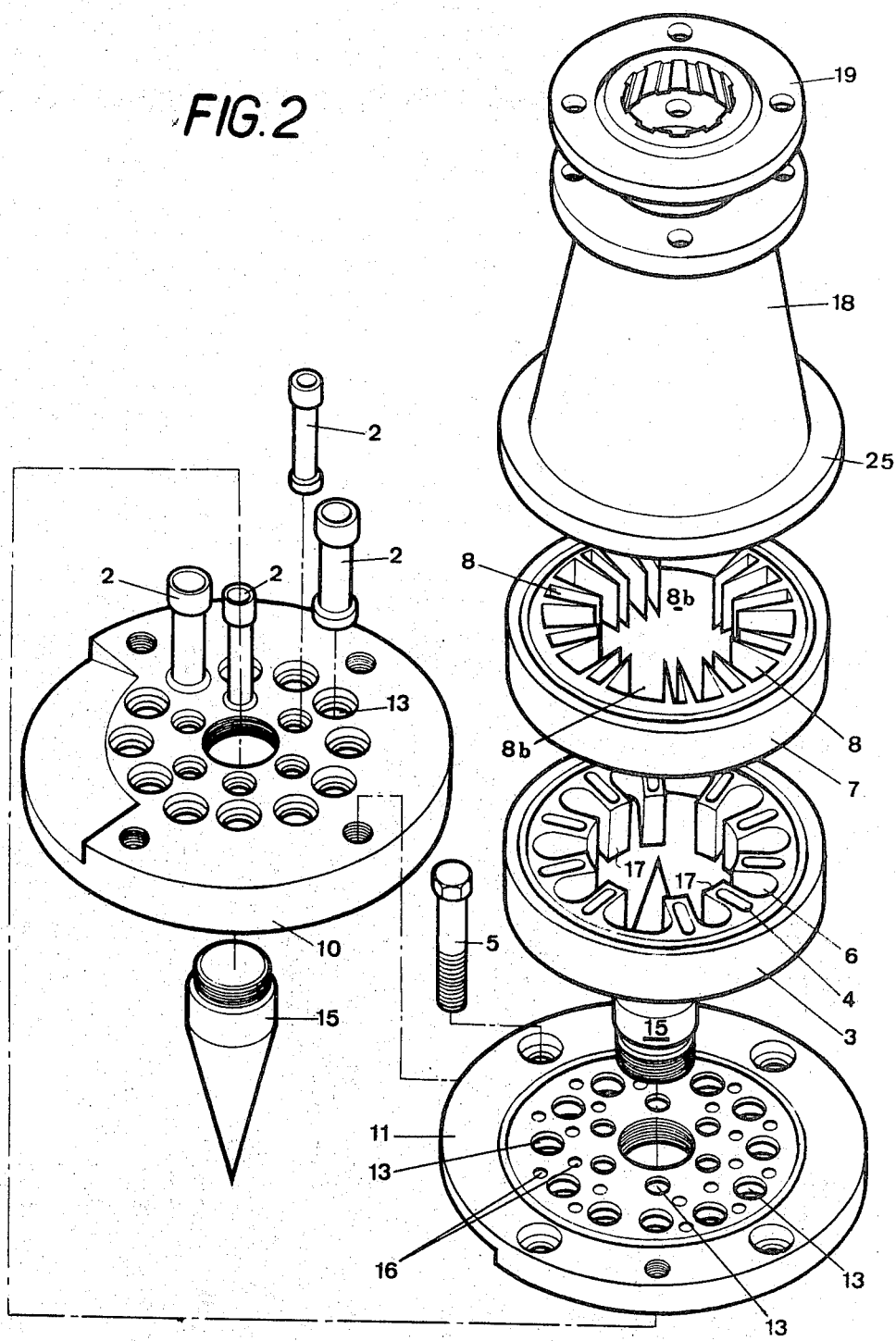
FIG. 2 is a broken perspective view of the members constituting the extrusion device of FIG. 1.

With reference to FIGS. 1 and 2, it will be seen that the extrusion device shown, according to the present invention, comprises: a chamber 1 with tubular members or conduits 2 passing therethrough for flowing the first material under pressure which comes from the supply source A1 and further comprising a supply source A2 for a second material under pressure; a first annular plate 3 of the crown-wheel type comprising oblong radial apertures 4 and radial recesses 6; a second annular plate 7 of the crown-wheel type comprising internal channels 8; and finally, a nozzle or sleeve with grooves bored therethrough in the shape of a truncated cone 9.

Chamber 1 is formed by two circular discs 10, 11, connected together by screws 5, fitted together in a cylindrical sheath housing 12 which is a portion of the extrusion head T, spaced apart the one with respect to the other by tubular members 2 which act as cross-pieces and arranged according to a circle around the extrusion axis AE. These tubular members have their ends fitted together under pressure, in order to be removed in each one of the extrusion openings 13 of each disc which is used for the beginning of the extrusion of the first material. The cylindrical sheath housing 12 comprises a supply inlet 14 for the second material. Each disc bears in its center a cylindro-conical member or core 15 for guiding the flow of the first material, first in an expanded condition before it passes through the tubular members and then, in a compressed condition after it has passed through the tubular members in order to avoid the bubbling of the material. The disc 11, positioned on the side opposite to supply A1, comprises extrusion openings 16 which are also arranged between the openings 13, the second material under pressure contained in the chamber passing through the extrusion openings 16 which surround the tubular members 2.

The first annular plate 3 comprises oblong radial apertures 4 positioned in register with the extrusion openings 16 of the disc 11, whereas its radial recesses 6 are positioned in register with the extrusion openings 13. In this annular plate, the flanges 17, in which are located the oblong apertures 4, and which separate the recesses 6, are designed in such a manner that their side walls do not overlap the section of the extrusion openings 13 and their height is sufficient for allowing a clearance between their projection and the external surface of the cylindrical part of the core 15 borne by the disc 11.

The second annular plate 7 comprises channels 8 which are arranged in such a manner that one out of two of the channels are respectively in register with the first one with an oblong aperture 4 and the second one with a recess 6 of the first plate 3; their respective width will be, according to their registering, substantially equal to the width of an aperture 4 or a recess 6. Those channels 8 are distributed according to two equal areas on both sides of two channels 8b, which are wider and which are in front the one with respect to the other and which correspond to two channels for the basic material and one channel for the additional material. Those two wider channels correspond to the two side edges of the toilet soaps to be manufactured in order to avoid at the time of molding the possibility of the veins being brought together on the sides. Each separation between two successive channels has the shape of a tapered blade and a height substantially equal to the height of each flange 17, so as to constitute a sharp guiding member between the extruded materials.

The sleeve with the boring in the shape of a truncated cone 9 is constituted by two parts 18 and 19. The part 18 comprises internal longitudinal grooves constituted by low depth grooves 20 with parallel edges and a width which is substantially equal to the width of each small channel, namely the width of the vein of the second extruded material in the oblong apertures 4. It should be noted that the diameter at the bottom of the grooves 20 is substantially equal to the diameter at the bottom of the channels of the second annular plate 7. The part 19 comprises also internal longitudinal grooves constituted by grooves 21 corresponding at their beginning to the grooves 20 and extending the grooves 20 with the same depth, but with slightly converging edges. It will be noted, however, that this part 19 has a boring in the shape of a truncated cone, the conicity of which is greater than the conicity of the truncastical boring of the part 18. In addition, this part 19 is fixed in a removable manner by its input side to the output side of the part 18.

It should be noted that all these members, chamber 1, first annular plate 3, second annular plate 7 and first part 18 of the sleeve 9 are joined by pressure and in a tight manner, the ones with respect to the others on their corresponding faces by means of seals J which may be either O-rings or sealing joints. The sealing pressure is provided by screwed stems 23 anchored on lugs 22 of the cylindrical sheath housing 12 which cooperates by screwing up the bolt 23' with a counterflange 24 resting upon the flange 25 of the part 18, the disc 10 of the chamber 1 resting by means of an O-ring 26 against an internal shoulder 27 of the cylindrical sheath housing 12 on the side of the supply A1 for the first material.

The simultaneous extrusion process for two different materials according to the present invention will be now very easily understood with reference to FIGS. 1 and 2.

in fact, the first material A1 is supplied under pressure to enter the tubular members 2 whereas the second material is fed under pressure at A2 and enters simultaneously through the opening 14 in the chamber 1 and is extruded through openings 16 of disc 11; then, each one of the materials passes separately and without contact between themselves respectively through the oblong apertures 4 and the recesses 6 of the first annular plate 3; then the veins of the additional material come into contact with the mass of the basic material in the second annular plate, the veins of the additional material and the basic material being guided in the channels 8 without any side contact between themselves; then, all the materials are subject to a first radial compression in the truncastical boring of the part 18 which leads the materials to converge symmetrically and to join together without gyration as they are guided by grooves 20; the assembly is finally subject to a second and last radial compression in the truncastical boring of the part 19 without possibility of gyration as they are guided by grooves 21; then the assembly of composite materials comes out of the part 19 as a compact bar provided with veins in the mass which shows on its external surface regular, orderly and substantially parallel stripes.

Figures 3, 4:
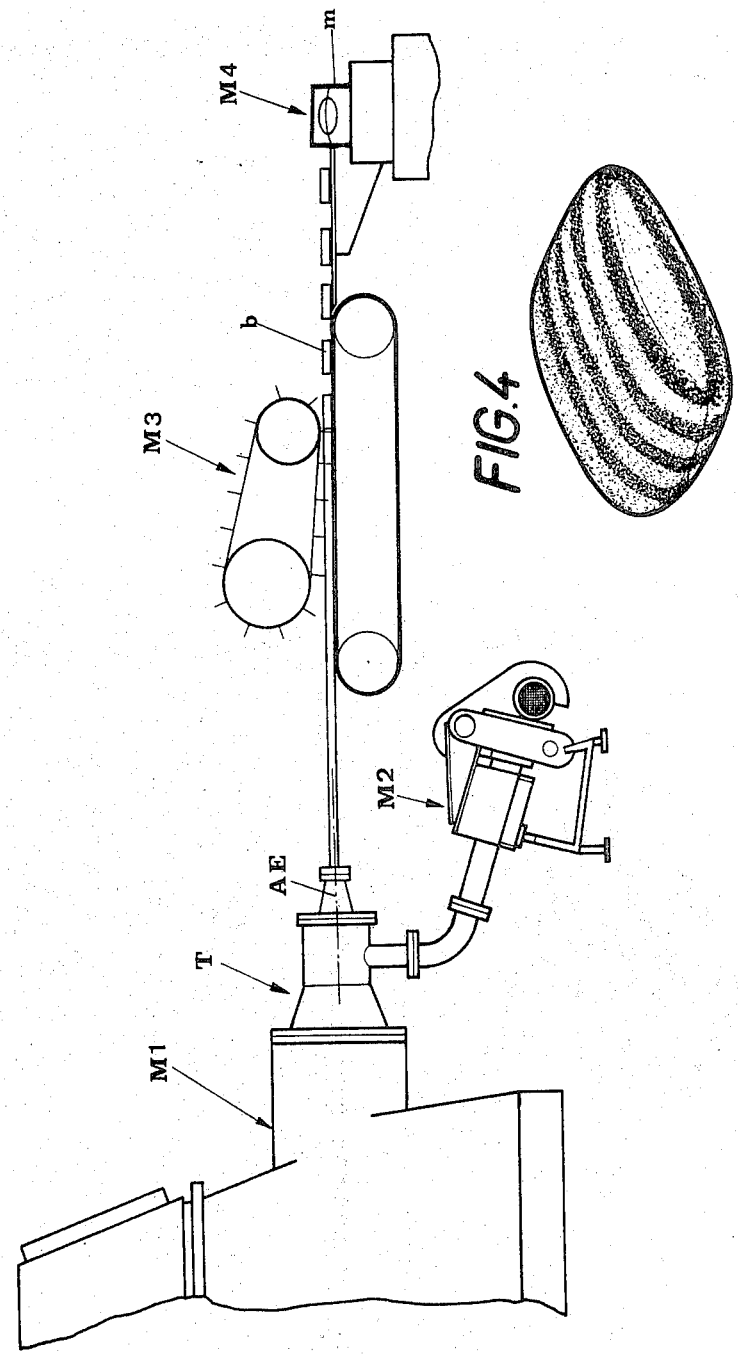
FIG. 3 is a schematic view of a device in which there is performed the extrusion process according to the invention for the continuous manufacture of toilet soaps.
FIG. 4 is a perspective view of a toilet soap obtained with the equipment of FIG. 3.

Referring to FIG. 3 for describing an application of this process to the manufacture of soaps or toilet soaps, the installation as shown comprises in an operative relationship: an extrusion head T comprising internally the extrusion device of a soap bar provided with veins, according to the process of the present invention, this device being fed with the first material under pressure by machine M1 which can be a slubbing machine and with a second material under pressure by machine M2 which can be an endless screw machine; a chopping machine M3 which cuts the extruder bar into cakes b; and a molding machine M4 under compression comprising a mold m consisting for example of a lower stationary shell and an upper shell which moves back and forth in a vertical direction.

The molding assembly can be orientated horizontally with respect to the longitudinal axis of the travel of the cakes. In the case where the mold is positioned right in prolongation of the axis of the cakes of the extrusion axis, the toilet soaps obtained by compression will show longitudinal stripes as illustrated in FIG. 4 whereas in case the mold is positioned slant-wise, the stripes will appear diagonally, that is, forming an acute angle with the axis of the cakes.

If it is desired to obtain a product consisting of more than two various materials, it is sufficient to carry out the same extrusion process by adding as many M2 machines, such as for instance, slubbing machines, as additional materials are involved and by adding also other corresponding feeding openings 14 in chamber 1, this chamber having then only to be partitioned into several chambers in order for each one to be capable of distributing a material without contact with the adjacent materials.

For carrying out the process according to the present invention, there is generally used a soap in flake form assaying about 78 percent to 82 percent of pure acids with a composition of about 15 percent to 20 percent of copra and about 80 percent to 85 percent of exedible tallow, this mixture containing about 0.25 percent of sodium chloride.

There can be added to the mixture as described above, the following optional additive products:

1. a sequestrant product in a ratio of about 50 to 100 g for 100 kg of soapy material. The purpose of this product is to avoid the undesirable effects of the metallic particles which are contained in the soapy material and which could modify the colors of the soap.

2. an anti-oxidizing product in the ratio of about 50 to 100 g for 100 kg of soapy material. The purpose of this product is to ensure that the mixture will remain stable.

3 a perfume in the ratio of about 1 to 2 percent.

4. a deodorant product in the ratio of about 0.5 to 3 percent.

5. a dyestuff in a proportion varying between about 3g and 80g for 100 kg of soapy material.

It is understood that the above products are not absolutely necessary for carrying out the process according to the present invention, but are preferred either individually or in combination as they improve the quality of the soaps obtained.

A number of examples illustrate the process which is the subject matter of the present application, but it will be understood that these examples do not limit the scope of the invention and they are given only for illustration.

EXAMPLE 1

100 kg of flakes of soapy material as indicated above are treated in an helical blender of the Werner type or of the continuous type. Added thereto are 200g of sequestrant product, such as Sequestren ST of Geigy in powder, 200g of anti-oxidizing product sold under trademark "Rhodia" by Rhone Poulenc, 500g of overfattening product sold under the trademark "Eutanol" by Henkel for plastifying the paste, making same softer, more glossy and more unctuous, and 1.000g of perfume sold by the Bruno Court Company under reference 49–178.

Starting with the above-identified paste, for obtaining the basic material, there is added 500g of the deodorant manufactured by Pierrefitte-Auby company and 6g of lamp-black as a dyestuff for 100 kg of paste.

Starting from the above-mentioned paste for obtaining the material of the stripes, there is added as deodorants 250 g of trifluoromethyldichloro-diphenylurea sold by the Geigy company under trademark "Irgasan CF3" and g of deodorant of the Monsanto company and as dyestuff 10g of the Iragon blue PSD sold by Geigy.

The resultant products are soaps or toilet soaps of grey color with blue stripes.

EXAMPLE 2

To the same starting soapy material as above, there is added 300g of the liquid sequestrant product sold by the Protex company under trademark "Masquol BS," 200g of the anti-oxidizing product sold under trademark "Kodak BHT" and 1,500g of the perfume sold by the Bruno Court company under reference 48–038.

To the above-mentioned material, 700g of deodorant of the Pierrefitte-Auby company and 10g of the dyestuff No. 5,011 of the Givaudan company can be added for the base material.

Also to the above-mentioned material, the stripe material can be obtained by adding as a deodorant 350g of the above-mentioned Irgasan CF3 and 350g of the deodorant of the Monsanto Company as well as a dye stuff such as Iragon green P45D of Geigy in the ratio of 28g.

Yellow soaps or toilet soaps with green stripes are thus obtained.

EXAMPLE 3

To the same starting soapy material as before, there can be added sequestrant products in the ratio of 30g of Sequestren ST as already mentioned and 30g of the product sold by the Prochim company under trademark "Edetol". In addition, 60g of the anti-oxidizing product sold under trademark "Rhodia" by Rhone Poulenc, 800g of the perfume sold by the Bruno Court company under reference 49–178, and finally, 500g of an overfattening product sold by the Sinnova company under trademark "Sinnomide DC" can be added.

The basic material can be obtained from the above-mentioned material, by adding 500g of the deodorant of the Pierrefitte-Auby company and 16g of the Iragon red PSD sold by the Geigy company. Also from the above-mentioned material, there is obtained the material of the stripes by adding a deodorant product in the ratio of 250g of the product known under the trademark Irgasan CF3 and 250g of the Monsanto deodorant as well as 8g of the dyestuff sold by the Geigy company under the trademark Iragon blue PSD. There is then obtained soaps or toilet soaps which are rose with blue stripes.

EXAMPLE 4.

To the same soapy material as before, there is added 30g of the sequestrant product sold under trademark Sequestren ST and 30g of the product sold under trademark Edetol. There is added in addition 60g of the anti-oxidizing product already mentioned under trademark Rhodia and 1,000g of the perfume sold by the Bruno Court company under reference 49–178.

From the above-mentioned material, the basic material is obtained by adding 500g of 3,4′,5-tribromosalicylanilide, such as manufactured by the Pierrefitte-Auby company as a deodorant as well as a dyestuff such as titanium oxide in the ratio of 30g. Also from the above-mentioned material there is obtained the material of the stripes by adding as a deodorant 250g of the above-mentioned Irgasan CF3 and 250g of the 3,4,4′-trichlorocarbanilide sold by the Monsanto company under trademark TCC as well as 60g of the Uniperse red GR in paste sold by the Ciba company.

Soaps or toilet soaps which are of white color with red stripes are thus obtained.

The pressure of the treated pastes is in the range of 5 to 10 kg/cm$^2$ but should be higher with respect to the material of the stripes. This is achieved by adjusting the speed of the slubbing machine M2 in such a manner that the speed is higher than the speed of the slubbing machine M1. Thus, the grooves 20 and 21 will always be filled with the material used for forming the stripes. The slubbing machine used might be for example the slubbing machines of the Mazzoni company which are known under the names Triplex or Duplex and which would have to be adapted to the extrusion system which is the subject matter of the present invention. It will be finally noticed that the titre of the materials to be treated, that is the hardness of the materials concerned at a given temperature, has to be well determined in order that the soap cakes, at the time of molding, do not break or crack and in order for the stripes obtained to have a fine appearance.

In order that the above described device produces the best results, it is necessary that at the start of the manufacturing program, the extrusion members are maintained at a temperature comprised between about 60° C and 80° C., preferably 70° C., and the temperature of the material to be extruded during the processing is in the range of about 40° C. to 70° C.

The embodiments of the invention in which an exclusive property or privilege is claimed are defined as follows:

1. An extrusion apparatus for manufacturing a composite product, such as soap, from two separate materials, comprising:
   a. means defining a chamber surrounding an extrusion axis,
   b. an end plate for the chamber positioned transverse to the direction of extrusion and having first and second hole groups therein spaced around the extrusion axis,
   c. a plurality of tubular members individually fitted to each of the holes of the first group through which a first material is flowed under pressure,
   d. means for supplying a second material to the chamber under pressure for extrusion therefrom through the second group of holes,
   e. a first annular plate positioned after the end plate in the direction of extrusion and having radial apertures around its internal periphery corresponding to and registering with the second group of holes and radial recesses around its internal periphery corresponding to and registering with the first group of holes, and
   f. a sleeve in the form of a truncated cone positioned after the first annular plate in the direction of extrusion for radially compressing the materials extruded from the annular plate and for associating them together as a composite bar.

2. An apparatus as defined in claim 1, further including between the first annular plate and the sleeve, a second annular plate having internal open channels corresponding alternately to the radial apertures and the radial recesses of the first plate.

3. An apparatus as defined in claim 2, wherein two of the open channels carrying the first material and positioned opposite one another are widened for preventing adjacent stripes of the two materials from coming together when the composite material is subsequently molded.

4. An apparatus as defined in claim 2, wherein said chamber comprises two circular discs fitted together in a cylindrical housing, one of the discs being the end plate, spaced apart from each other by the tubular members which act as cross-pieces and are arranged in a circle around the extrusion axis, the cylindrical housing having a supply inlet for the second material located between the discs, the second group of holes in the end plate disc being arranged in a circle around the extrusion axis and positioned radially in intermediate locations between the tubular members.

5. An apparatus as defined in claim 4, wherein the holes of the first and second hole groups are of different diameters to prevent the soap material from becoming sleeky or glazed and to compensate for the pressure differences between the various extruded materials.

6. An apparatus as defined in claim 5, wherein the sleeve comprises two parts in the shape of a truncated grooved cone which are assembled together, the first part having a large internal diameter at its inlet end adjacent the annular plate and having longitudinal grooves with low depth and parallel edges positioned in register with the recesses and apertures of the annular plate, the width at the bottom of such grooves corresponding substantially to the width at the bottom of the recesses and apertures, the large diameter inlet end of the second part being secured to the outlet end of the first part, the second part having a conicity which is greater than that of the first part and having longitudinal grooves with converging edges, the position and the depth of which correspond to the grooves in the first part.

7. An apparatus as defined in claim 4, wherein each of the discs has a cylindrical-conical shaped member at its center axially aligned with the extrusion axis, the member held by the end plate disc passing through the first annular plate with its cylindrical portion and passing through the second annular plate with its conical portion.

8. An apparatus as defined in claim 2, wherein the chamber, the two annular plates and the sleeve have on their associated faces circular slots for o-rings and are compressively joined together in a detachable manner.

9. An apparatus as defined in claim 1, further comprising a cutting device operatively positioned adjacent the outlet of the sleeve for separating the composite bar into discrete increments, and a molding device operatively positioned after the cutting device and having an upper part and a lower part oriented with respect to the extrusion axis.

* * * * *

UNITED STATES PATENT OFFICE
CERTIFICATE OF CORRECTION

Patent No. 3,779,676        Dated December 18, 1973

Inventor(s) Alain Clair BERNARD

It is certified that error appears in the above-identified patent and that said Letters Patent are hereby corrected as shown below:

On face of the Patent:

Delete "[73] Assignee: Alain Clair Bernard, Nantes, France"

Insert -- [73] Assignee: Savonnerie Clair Bernard --

Insert -- Foreign Application Priority Data

October 26, 1970    France    70/38577 --

Signed and sealed this 7th day of May 1974.

(SEAL)
Attest:

EDWARD M. FLETCHER, JR.
Attesting Officer

C. MARSHALL DANN
Commissioner of Patents